Patented Jan. 8, 1924.

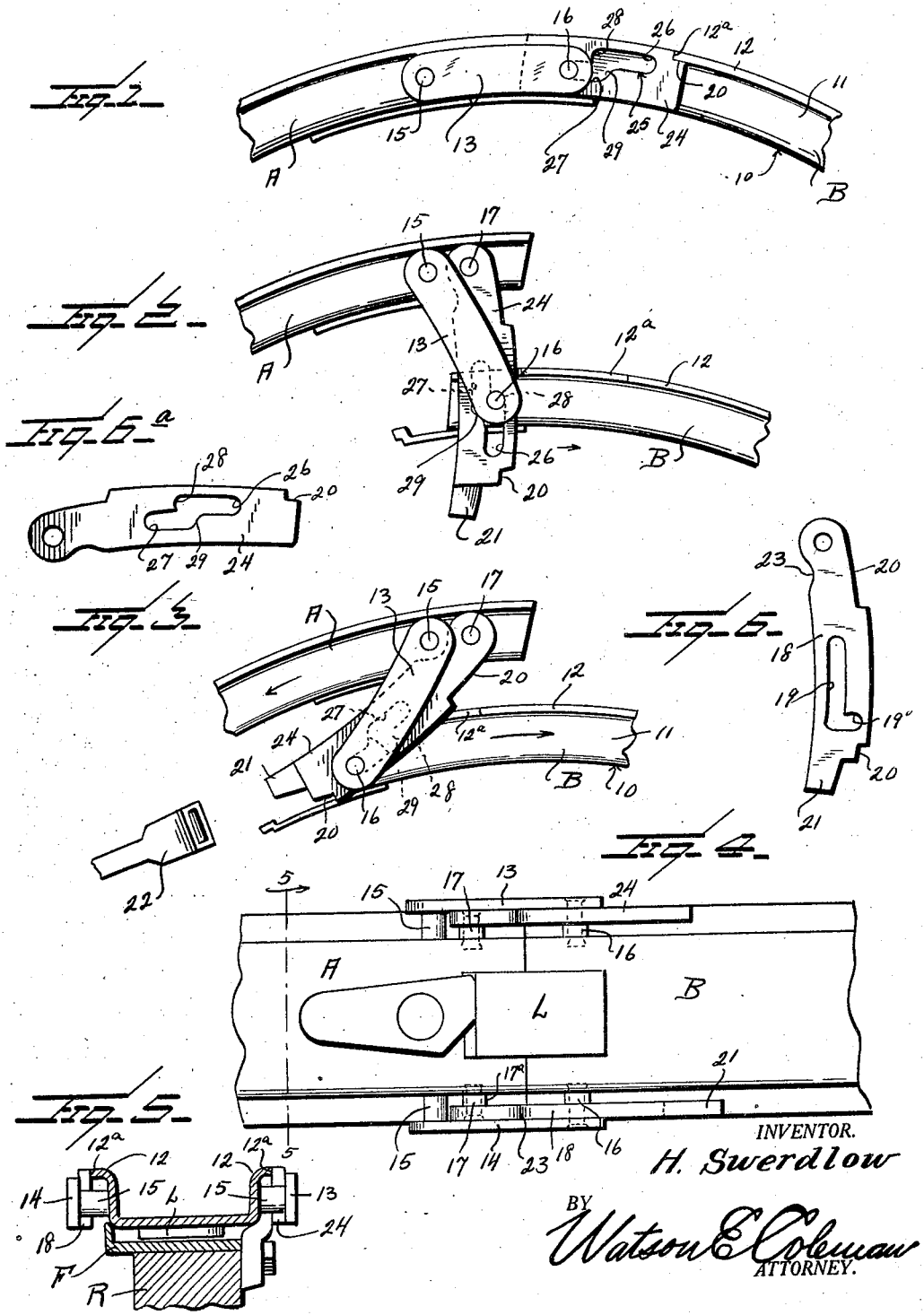

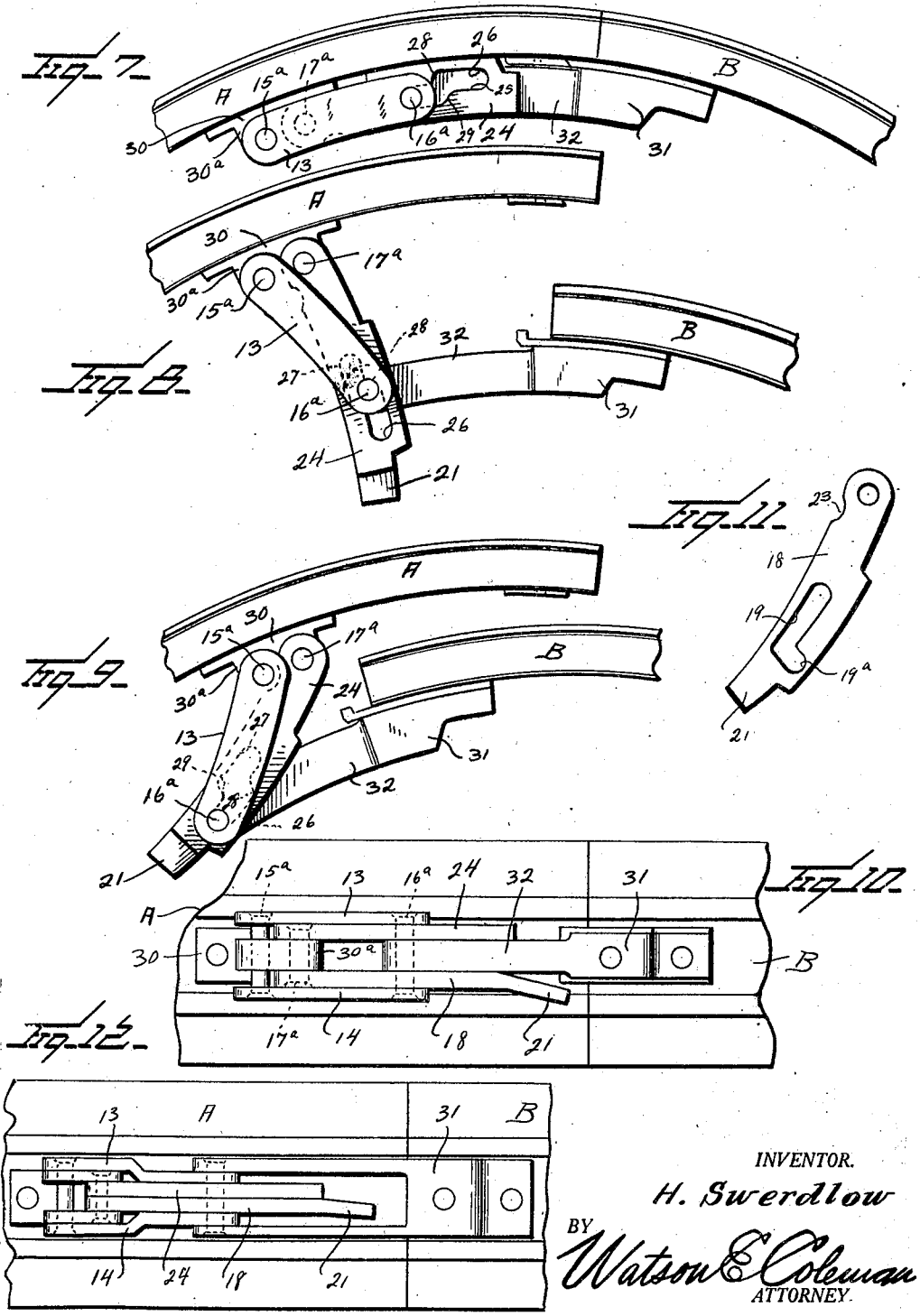

1,479,940

UNITED STATES PATENT OFFICE.

HARRY SWERDLOW, OF NEW YORK, N. Y.

COLLAPSIBLE RIM FOR AUTOMOBILE TIRES.

Application filed February 17, 1923. Serial No. 619,683.

*To all whom it may concern:*

Be it known that I, HARRY SWERDLOW, a citizen of the United States, residing at New York city, in the county of New York and State of New York, have invented certain new and useful Improvements in Collapsible Rims for Automobile Tires, of which the following is a specification, reference being had to the accompanying drawings.

This invention relates to collapsible rims for automobile tires of that type wherein the rim is a split rim capable of being bent at the joints so as to permit the expansion of the rim within a tire shoe or the contraction of the rim to permit the removal of the shoe, and is a continuation in part of the joint application of John H. Bowles and Harry Swerdlow, Serial #579,190, filed August 2, 1922, for collapsible rims for automobile tires, and more particularly the continuation in this application of the application above identified lies in that portion of the application relating to the construction of the lock or safety key.

An important object of the present invention is to provide a novel construction of mounting for the lever, by means of which the rim is contracted or expanded, whereby the lever acts not only as a lever but as a cam in its operation.

A still further object of the invention is to provide an improved mounting for the lever and the lock hereinbefore referred to.

A still further object of the invention is to provide a positive locking device for the lever differentiated from the off-center locking device described in the above identified application and in the prior patent to John H. Bowles, issued on July 25, 1922, #1,424,073.

These and other objects are accomplished by the structure shown in the accompanying drawings, wherein for the purpose of illustration I have shown preferred embodiments of my invention and wherein like reference characters designate like parts throughout.

In the drawings:—

Figure 1 is a fragmentary side elevation of a tire rim of ordinary construction showing a rim control apparatus in accordance with my invention, the rim being shown in fully expanded position;

Figure 2 is a view similar to that shown in Figure 1, with the rim partly expanded and locked in such partially expanded position;

Figure 3 is a further view showing the rim fully contracted and the lever in a locked position, the handle of the lever being shown detached;

Figure 4 is a bottom plan view of the rim showing the relative positions of the various parts;

Figure 5 is a section on the line 5—5 of Figure 4;

Figure 6 is a detail side elevation of the lever;

Figure 6ª is a similar view of the safety key;

Figures 7, 8 and 9 are views similar to those shown in Figures 1, 2 and 3 and illustrating a modified form of mounting which may be employed with wheels having hollow fellies;

Figure 10 is a bottom plan view showing this form of construction;

Figure 11 is a side elevation of the lever;

Figure 12 is a bottom plan view illustrating a slight modification of the form shown in Figures 7 to 10 inclusive.

Referring now more particularly to the drawings, the numeral 10 designates a tire rim of the usual expansible type, and A and B the adjacent ends of the tire rim. 11 designates the side flanges and 12 the horizontally disposed flanges at the upper ends of the side flanges, all of these parts being of the usual construction employed. At the opposite side flanges of the rim and at the split thereof are provided links 13 and 14 connected to the section A by pivots 15 and to the section B at the corresponding point by pivots 16, these pivots and links being so constructed that the ends of the sections A and B are in the proper relation when aligned with one another.

In accordance with my invention, I provide adjacent the pivots 15 and intermediate these pivots and ends of the sections A other pivots 17 engaging in the side flanges 11 beneath the links 13 and 14. Upon the pivot 17 intermediate the side flange 11 and the link 14, I mount one end of a lever 18 having formed therein a longitudinally extending slot 19 which receives the bolt 16 of the section B. The end of the slot 19 adjacent the free end of the lever 18 is provided with an angular cove 19ª, which cove is directed toward the adjacent horizontal flange when the lever is in the position shown in Figures 1 and 4. The lever 18 is spaced from the adjacent face of the side flange 11 by means of spacers 17ª mounted upon the pivots 16 and 17 respectively so that the outer face of this lever approximates the outer edge of the horizontal flange 12 of the rim. A portion of this flange is cut away, as indicated at 12ª, to receive the upper edge of the lever, the lever being provided at the ends of such upper edge with continuations forming stop shoulders, indicated at 20, which engage against the under surface of the horizontal flange 12 to limit the movement thereof. At its free end the lever is provided with a portion 21 adapted to be received by a socket wrench, by means of which the lever may be rotated. Adjacent its attached end and upon that face thereof next adjacent the pivot 15 of the link 14 when the lever is in the position shown in Figure 3, a notch is formed, as indicated at 23, to provide for a slightly greater movement of the lever than would ordinarily be possible.

With the parts in the position shown in Figure 1, if the handle 22 is applied to the lever 21 the rotation of the lever through the handle will cause the lever 18 to apply to the link 14 a combined leverage and camming action through the pivots 16 thereof, this leverage and camming action first separating the rim sections to draw the section B inwardly of the section A and subsequently contracting the sections to the point shown in Figure 3. Upon arrival of the pin or pivot 16 at the end of the slot 19, a continued movement of the lever will cause this pivot to engage in the cove 19ª so that tendency of the rim sections to move under the natural resiliency of the rim in the direction of the arrows in Figure 3 will be positively resisted by the engagement of the pin 16 against the shoulder of the cove. In releasing the lever, a movement of the handle 22 in a direction away from the rim in Figure 3 will first cause the lever to shift with relation to the pin 16 until the same is aligned with the slot 19, subsequently to which rotation of the lever will permit the pivot to move longitudinally of the slot and the sections of the rim to move to their expanded position.

It will be obvious that were the construction above described employed alone, the tendency of the sections A and B to separate by the natural resilience of the rim would cause a rapid movement of the lever 18 and handle 22, with a possible resultant injury to the hands of the operator. In order that this may be prevented, I provide intermediate the link 13 and the adjacent flange 11 of the rim a lock or key 24 similar to that described in the application above identified. This lock comprises a link-like structure having formed therein a slot 25. This slot is formed of two sections 26 and 27 offset transversely of the link with relation to one another. At the adjacent ends of the sections 26 and 27, the slot 25 is formed with a shoulder 28 forming a stop for the pin 16 of the link 13 which is slidable therein, the end of the safety lock being pivoted upon the pivot 17 hereinbefore described. The structure of the lock is similar to that of the lever hereinbefore described with the exception of the fact that the lock is not provided with the extension 21 for the reception of the handle 22.

Assuming the parts to be in the position shown in Figure 3 and that it is desired to expand the rim, the lever 18 through the handle 22 is moved from the left toward the right in Figure 3 to the position shown in Figure 2. During this movement the pivot 16 of the link 13 rides in the section 26 of the slot until it comes into engagement with the shoulder 28 at the end of the section 26 thereof, at which time movement of the rim sections will be positively prevented, it being impossible for the link pivot 16 to move toward the center or pivoted end of the safety key 24 until the same has been shifted in the direction of the arrow in Figure 2 to release the pin 16 from the shoulder. This release may be accomplished by tapping upon the end of the key 24 with the handle 22 or any other implement and as soon as this has been accomplished the resilience of the rim will cause the parts to take the position shown in Figure 1, when the usual lock L may be employed to lock the sections in proper position.

Attention is directed to the fact that the positioning and construction of the various parts hereinbefore described is such that they in no manner interfere with the application of a rim equipped therewith to a flat felly F of the type usually employed in automobiles where the wheel has a wooden rim R. It will furthermore be obvious that the rim is by the means hereinbefore described locked both in a fully contracted position and in a partially contracted position and, as will be obvious to those familiar with the art, these lockings will tend to prevent injury to the hands of the operator often resulting in the use of structures of this type.

In Figures 7 to 12 inclusive, the illustration shows embodiments of my invention capable of use with hollow fellies such as the ordinary steel felly which is likewise in common use in automobile wheels. Such fellies which are well known and accordingly not herein illustrated are provided with spaced flanges of considerable height, affording therebetween a space in which the operating and locking mechanism for the flange may be housed and accordingly the locking mechanism may be mounted upon the under surface of the rim instead of at the side flanges thereof.

In mounting the locking mechanism on rims of this type, I provide upon the section A a bracket 30 having an upstanding mounting portion 30ª and upon the section B a second bracket 31 having an extension 32 overlying the section A when the rim sections are in their fully expanded position.

In employing this construction, the pivots 15 and 17 carried by the section A are replaced by pivots 15ª and 17ª extending through the mounting portion 30ª of the bracket 30 and upon opposite ends of which the links 13 and 14, lever 18 and lock 24 are mounted. The pivots 16 are similarly replaced by a single pivot 16ª extending through the extension 32 of the bracket 31, the slots of the lock and lever and the opposite ends of the links 13 and 14. These mounting portions may be either formed solidly, as indicated in Figures 7 to 10 inclusive, or may be furcated, as indicated in Figure 12, as is found most desirable in construction. In each of these forms the operation of the various parts is similar to that set forth in the description of the operation in Figures 1 to 6 inclusive.

While I have illustrated constructions which have been found particularly effective in actual practice, I do not wish to be limited thereto, as it is obvious that minor changes might be made in the details of construction and arrangement of parts without departing from the spirit of the invention as defined in the appended claims.

I claim:—

1. In combination with a split resilient tire rim, a link pivoted at an end to each of the sections of the rim, a lever pivoted to one of the sections upon a pivot adjacent the end of the section and the pivot of the link, said lever having a slot through which the pivot of the link of the other of the sections extends, the slot having formed at that end thereof next adjacent the free end of the lever an angular cove directed toward that side of the lever which is outermost when the lever and link are in aligned position.

2. In a resilient tire rim split at one point, a link pivoted at one extremity to one section of the rim and at its opposite extremity to the opposite section of the rim, a lever pivoted to one of said sections and having a slot receiving the pivot of the link of the other of said sections, the engagement of said pivot with an end of the slot limiting the movement of the lever in a direction to contract the rim after the pivotal centers of the link have been moved past a radial line intersecting the centers, and an angular cove at said end of the slot for the reception of the last named pivot of the link.

3. In a resilient tire rim split at one point, a link pivoted at one extremity of one section of the rim and at the opposite extremity to the other section of the rim, a lever pivoted to the first named section of the rim intermediate the pivot of the link and the end of the section, the engagement between said lever and the pivot of the link to the last named section camming the pivot to contract the sections upon movement of the lever in one direction, means limiting the movement of the lever in said direction, and means upon the lever engaging the last named pivot of the link when the rim is in fully contracted position to lock the same against return movement.

4. In combination with a split resilient tire rim, a link pivoted to each section of the rim, and a lever pivoted to one of said sections and having a slot receiving the pivot of the link of the other of said sections, said lever being provided at the free end of the slot thereof with an angular cove for the reception of such pivot and with which the pivot is aligned when the sections are in contracted position.

5. In combination with a split resilient tire rim, a link pivoted to each section of the rim, a lever pivoted to one of said sections and having a slot receiving the pivot of the link of the other of said sections, said lever being provided at the free end of the slot thereof with an angular cove for the reception of such pivot and with which the pivot is aligned when the sections are in contracted position, and releasable means positively limiting the movement of said sections from contracted to expanded position.

6. In combination with a split resilient tire rim, a link pivoted to each section of the rim, a lever pivoted to one of said sections and having a slot receiving the pivot of the link of the other of said sections, said lever being provided at the free end of the slot thereof with an angular cove for the reception of such pivot and with which the pivot is aligned when the sections are in contracted position, and releasable means positively limiting the movement of said sections from contracted to expanded position including a member pivoted to one of the sections and having a slot receiving a lug or pin carried by the other of the sections, said slot being formed in off-set sections, in one of which said pin operates during return of the rim sections from contracted to expanded position, the end of said section being provided with a shoulder forming a stop for the rim.

7. In combination with a split resilient tire rim, a link pivoted to each section of the rim, a lever pivoted to one of said sections and having a slot receiving the pivot of the link of the other of said sections, said lever being provided at the free end of the slot thereof with an angular cove for the reception of such pivot and with which the pivot is aligned when the sections are in contracted position, releasable means positively limiting the movement of said sections from contracted to expanded position, and means detachably locking the lever from movement in a direction to permit the expansion of the rim after the pivotal centers of the link have been moved past a radial line intersecting the centers.

8. In combination with a tire rim split at one point, a link pivoted at its ends to the sections of the tire rim, means connecting the sections of the tire rim whereby the ends of the rim may be shifted out of alignment with each other and into contracted, lapping relation, a locking key pivoted to one of the sections of the tire rim and having a longitudinally extending slot through which the pivot connecting the other section of the tire rim to the link passes and operates, this slot having a main portion extending from a point adjacent the free end of the key toward the pivotal end thereof, and an off-set portion adjacent the pivotal end of the link, the end of the main portion having a shoulder constituting the stop for the pivot passing through the slot.

9. In combination with a tire rim split at one point, spaced links each pivoted at one end to one section of the tire rim and at its opposite end to the other section of the tire rim, a member arranged adjacent each of said links and pivoted to one of the sections, each of said members having a slot receiving the pivot of its adjacent link to the other of the sections, the slot of one of said members coacting with the engaged pivot to lock the rim in its fully contracted position, the slot of the other of said sections being formed to coact with the pivot of said link to form a stop positively limiting movement of the rim sections to expanded position at a point between the expanded position and the contracted position maintained by the first named member.

10. A tire rim split at one point, spaced links each pivoted at one end to one section of the tire rim and at its opposite end to the other section of the tire rim, a member arranged adjacent each of said links and pivoted to one of the sections, each of said members having a slot receiving the pivot of its adjacent link to the other of the sections, the slot of one of said members coacting with the engaged pivot to lock the rim in its fully contracted position, the slot of the other of said sections being formed to coact with the pivot of said link to form a stop positively limiting movement of the rim sections to expanded position at a point between the expanded position and the contracted position maintained by the first named member, the first named member forming a lever providing for contraction of the rim sections.

11. In combination with a split resilient tire rim, a pair of members each adapted for engagement with one section of the rim, a link pivoted to each of said members, a lever pivoted to one of said members and having a slot receiving the pivot of the link of the other of said sections, said lever being provided at the free end of the slot thereof with an angular cove for the reception of such pivot and with which the pivot is aligned when the sections of the rim are in contracted position.

12. In combination with a split resilient tire rim, a pair of members each adapted for engagement with one section of the rim, a link pivoted to each of said members, a lever pivoted to one of said members and having a slot receiving the pivot of the link of the other of said sections, said lever being provided at the free end of the slot thereof with an angular cove for the reception of such pivot and with which the pivot is aligned when the sections of the rim are in contracted position, and releasable means positively limiting the movement of said sections from contracted to expanded position likewise connecting said members.

13. The combination with a resilient tire rim split at one point, of a lever pivoted at one extremity to one section of the rim and pivoted intermediate its ends to the other section of the rim whereby the rim may be contracted or expanded, means limiting the movement of the lever in one direction to contract the rim after the pivotal centers of the lever have been relatively moved past a radial line intersecting the centers, and means detachably locking the lever from movement in a direction to permit the expansion of the rim after the pivotal centers of the lever have relatively moved beyond a radial line intersecting said centers.

14. The combination with a tire rim split at one point, of a lever pivoted at one end to one section of the tire rim and pivoted intermediate its ends to the other section of the tire rim whereby the ends of the rim may be shifted out of alignment with each other and into a contracted lapping relation, a locking member pivoted to one of the sections of the tire rim and having a longitudinally extending slot through which the pivot connecting the other section of the tire rim to the lever passes and operates, this slot having a main portion extending from the free end of the link toward the pivotal end of the locking member, and an off-set portion adjacent the pivotal end of the locking member, the end of the main portion constituting a limiting seat for the pivot passing through the slot, whereby the lever is held from closing against the rim when the ends of the rim sections are brought into radial alignment.

15. The combination with a resilient tire rim split at one point, of a lever pivoted to one section of the tire rim inward of the end thereof and pivoted intermediate its ends to the end of the other section of the tire rim, said pivot including a stud, a member pivoted to the extremity of the first named section of the rim and having a longitudinally extending slot through which said stud connecting the lever to the other section of the rim passes, said slot at one point in its length being off-set and then longitudinally extended, whereby to provide a limiting seat for the stud limiting the lever from completely closing when the lever is shifted to a position to permit the expansion of the rim under its own resilience.

16. The combination with a tire rim split at one point, and trough-shaped in cross section, of a lever trough-shaped in cross section and having longitudinally extending arms pivoted at their ends to one of the sections of the rim and pivoted intermediate their extremities to the other section of the rim whereby upon an oscillation of the lever the rim sections may be shifted into or out of alignment with each other, a link pivoted upon the extremity of one rim section and having a longitudinally extending slot, a pivot pin connecting the intermediate portion of the lever with the other rim section passing through said slot, said slot having a main portion extending at a slight inclination to the axis of the link and at its end adjacent the pivoted end of the link being outwardly off-set and being longitudinally extended, whereby to form a seat for the intermediate pivot pin detachably preventing the complete closing of the lever.

17. The combination with a resilient tire rim split at one point, of a lever pivoted at one extremity to one section of the rim and pivoted intermediate its ends to the other section of the rim whereby the rim may be contracted or expanded, means limiting the movement of the lever in a direction to contract the rim after the pivotal centers of the lever have been relatively moved past a radial line intersecting said centers, and means detachably locking the lever from movement in a reverse direction but permitting a movement of the rim in an expanding direction.

In testimony whereof I hereunto affix my signature.

HARRY SWERDLOW.